Patented Oct. 16, 1951

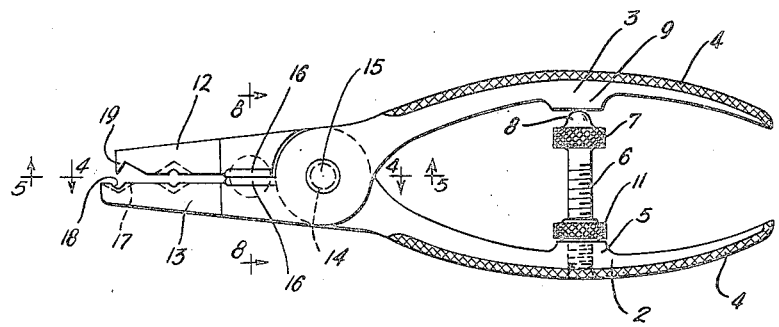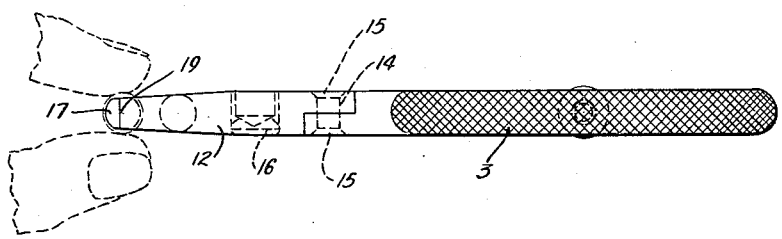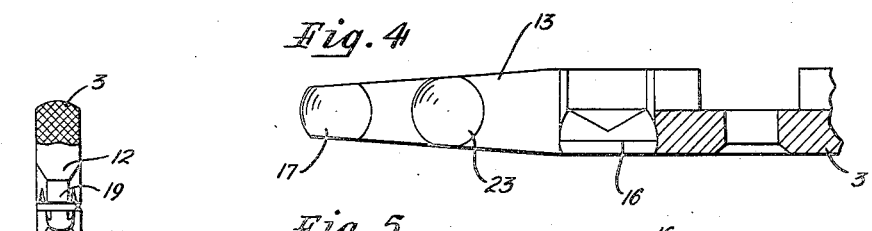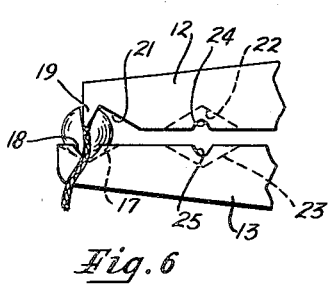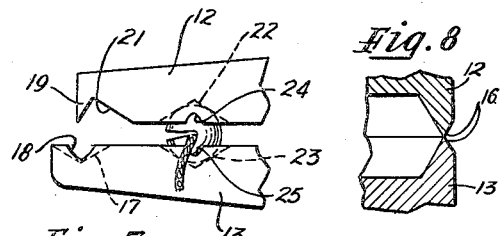

2,571,819

UNITED STATES PATENT OFFICE 2,571,819

PLIER TYPE SHOT SPLITTING TOOL

Henry C. Boel and Berthel C. Hallberg, Rockford, Ill., assignors to B. H. B. Mfg. Co. Inc., Rockford, Ill., a corporation of Illinois Application November 29, 1946, Serial No. 712,904

2 Claims. (Cl. 81—15)

The invention herein disclosed pertains to tools of a pliers type for use by fishermen in preparing and repairing fishing tackle and, more particularly, to a tool adapted for a variety of uses including such special purposes as opening and closing slots or cuts in lead sinkers for the insertion and removal of fishline, cutting gut and metal leaders, line, hooks, etc.

As every follower of the sport of Izaak Walton is well aware, the preparation of a fishline and other tackle often presents difficulties. The problems encountered are difficult enough at home but are multiplied in degree and number when met in the field. It is common practice among fisherman to carry along with them a great variety of fishing tackle and tools of assorted kinds for use in preparing, repairing and maintaining the tackle, as well as for other services. Frequently the fisherman resorts to home-made tools or to such handy implements and articles, such as stones procured at the site, to accomplish his ends. No job offers more tedium or is more exasperating than that of attaching a small globular shot or other lead weight or sinker to a line or removing said sinker from the line once it has been attached. Makeshift tools for cutting or splitting a lead ball usually leave much to be desired and when the split ball is to be closed to affix it to the line, it may be bitten between the teeth or hammered with a rock, both undesirable practices.

Accordingly, one of the primary objects of the invention is to provide a tool, easily carried in a fishing kit or on the person which is specially constructed to function to split a lead shot or ball or to open a preformed slit in such ball so that the same may be applied to a fishline, to function as a tool to press the fishline into the open groove or split in the sinker, or to aid in the removal of such line, and to function as an effective, such and otherwise satisfactory means to close the split in the sinker about the line running therethrough, thereby to fasten the sinker tightly to and securely on the line in a predetermined place.

Another object is to provide a tool which will be adapted to many other uses and purposes including use as a cutting tool to cut line, wire, gut, hooks, etc. and which otherwise may be handy as an "all around" piece of equipment for sportsmen.

Many other objects as well as the uses and advantages of the invention will be or should become apparent after reading the following description and claims, and after viewing the drawing in which:

Fig. 1 is a plan view of a pliers type tool embodying the invention;

Fig. 2 is a view of the tool of Fig. 1 looking at the same from a position 90° removed;

Fig. 3 is a front end view of the same tool;

Figs. 4 and 5 are enlarged views of fragments of the tool of the previous figure showing the inside or working faces of the jaws, the views being taken along the section lines 4—4 and 5—5, respectively, of Fig. 1;

Fig. 6 is an enlarged fragmentary view of the forward end of the pliers jaws illustrating the method by which a fishline may be pressed into a pre-opened slot in a lead shot sinker;

Fig. 7 is a view similar to that of Fig. 6 illustrating the manner in which the pliers may be used to close the slot in the lead shot sinker to clamp the same upon a fishline; and Fig. 8 is a fragmentary section taken along the section line 8—8 of Fig. 1.

The pliers type illustrated has a pair of forged or otherwise formed handles 2 and 3, the exterior surface of each of which is knurled as shown at 4 to provide a frictional gripping surface extending substantially from end to end of the hand gripping portion. The handle 2 may be provided with a boss 5 which is drilled and tapped for reception of a threaded adjusting screw 6 having a knurled head 7 and a projection 8 adapted to abut against a boss 9 upon the handle 3 thereby to act as a stop to limit the extent to which the handles may be moved together. A knurled lock nut 11 is threaded on the screw and when tightened down against the boss 5 will hold the screw 6 in adjusted position.

Integral with the handle 2 is what may be termed the "upper" jaw 12, while what may be termed the "lower" jaw 13 is integral with the handle 3. The handles with their respective jaws are swiveled upon a pivot pin 14, the ends of which are riveted over as indicated at 15 in the usual manner and for the usual purpose, as will be understood. Adjacent to the pivot each jaw is provided with a shearing edge 16, adapted to act as a cutter to cut line, gut, fish hooks and the like. At its outer end the lower jaw 13 projects beyond the terminous of the upper jaw 12 and is provided with a cupped recess or depression which may be formed as a conical depression as indicated at 17. Preferably at each side of the jaw a notch 18 connects the recess with the side face of the jaw for a purpose to be described. Such notches may be formed in the jaw by cutting the metal down from the inside or gripping face of the jaw transversely of the jaw face or they may be formed simultaneously with the formation of the cup-shaped recess in the face of the jaw if the radius and the bevel of the tool cutting the recess are such (relative to the width of the jaw) as to intercept the side wall of the jaw.

The upper jaw 12 at its outer end and directly opposite to the axial center of the cup or recess 17 is formed with a wedge shaped projection 19. The wedge is preferably of such breadth as the width of the lower jaw from outside face to outside face through the notches 18, but may be greater or less than such dimension. Adjacent to the wedge 19 the upper jaw is transversely cut away as shown at 21 for a purpose which will appear. Between the cooperative recess 17 and the wedge 19 and the cutting edges 16, each jaw is provided with a recess, 22 and 23 respectively, which are arranged directly opposite one another for registration. Each of these recesses is provided with a transversely extending notch, 24 and 25, respectively, these recesses and notches being formed after the manner of recesses 17 and notches 18.

If it be desired to prepare an uncut lead shot or the like for attachment to a fishline and to attach the same, the shot will be placed by hand within the recess 17 whereupon the user presses the handles 2 and 3 together which will bring the fairly sharp edge of wedge shaped projection 19 against the shot and continued pressure will cause the relatively sharp edge of projection 19 to cut into the shot. The depth of which the cut is made in the shot may be determined by eye or adjusting the adjusting screw 6. The cut will be made directly on a diametral plane of the shot and the tapering sides of the wedge shaped projection 19 will spread the soft metal of the shot apart as the wedge edge enters the shot. The gripping handles may then be opened to open the jaws whereupon the fishline may be laid through the slot formed in the shot and gently pressed down therein to the bottom, as illustrated in Fig. 6 of the drawing. The next step is to move the shot back beween the tool jaws to place it within the recesses 22 and 23 with the slot in the shot displaced 90° from the position in which it was located when the fishline was inserted, i. e., from the position of Fig. 6 to that shown in Fig. 7. Again the handles will be squeezed, this time to squeeze the shot to close the slot thereby clamping the shot on the fishline. Should it be desired to remove the lead shot sinker from the leader or line without cutting the line, the user may again place the shot in the recess 17 in the position of Fig. 6, holding the same between the fingers as shown in Fig. 2, and by squeezing the handles, the wedge projection 19 will enter the slot to reopen the slot and permit release of the leader. The screw 6 acts to limit the distance to which the wedge enters the slot and will be adjusted for each size shot so that the wedge cannot come into contact with the leader to damage the same. As will be appreciated the notches 18, 24 and 25 serve to permit the fishline to pass between the tool jaws without being clamped or injured by the jaws as they are brought together, and also to permit holding the shot against rotation during the respective operations as illustrated in Fig. 2.

Although we have illustrated and described the invention in its preferred form, it will be appreciated that it is susceptible of modification and variation without departing from the invention spirit or the scope of the appended claims.

We claim:

1. A fisherman's shot working tool utilized in releasing a shot sinker from a fish line, comprising a pair of pivotally interconnected elements having elongated opposed jaws thereon for movement toward and from one another with pivotal movement of the elements, one of said jaws having a recess between the side edges of the jaw opening toward the opposite jaw for receiving and positioning a shot sinker, at least one of the side walls between the recess and a side edge of the jaw being notched to receive the fishline upon which the shot is mounted, said opposite jaw having a cut-out providing a wedge shaped projection thereon at its end directed toward said recess in the first mentioned jaw, said projection extending laterally of the jaw, the edge of the wedge being in alinement with the notch and means for manually moving said jaws toward and away from each other to cut a groove in the shot sinker for releasing the shot sinker from the line.

2. A plier type fisherman's shot working tool, comprising a pair of levers pivoted intermediate their ends to form gripping handles on one side of the pivot and a pair of elongated opposed jaws on the opposite side of said pivot for movement toward and from one another, one of said jaws having a conical shaped recess therein adjacent its free end between the side edges of the jaw and opening toward the opposite jaw, said recess shaped to receive and position a shot, said recessed jaw having a notch at each side extending from said recess to the lateral sides of the jaw, said opposite jaw having a cut-out providing a wedge-shaped projection thereon adjacent its free end extending laterally of the jaw directed toward said recess in the first said jaw and having a lateral cutting edge, the end of said projection being in substantial alinement with said notches and shaped to cut a groove in the shot supported in the recess when the jaws are moved toward each other by manual manipulation of the handles.

HENRY C. BOEL.
BERTHEL C. HALLBERG.

REFERENCES CITED

The following references are of record in the file of this patent:

UNITED STATES PATENTS

| Number | Name | Date |
|---|---|---|
| 838,920 | Varnedoe | Dec. 18, 1906 |
| 1,300,495 | Shank | Apr. 15, 1919 |
| 1,382,500 | Goodridge | June 21, 1921 |
| 1,389,584 | Goodridge | Sept. 6, 1921 |
| 1,458,292 | Hart | June 12, 1923 |
| 1,732,676 | Erbele | Oct. 22, 1929 |
| 1,842,573 | Van Treek | Jan. 26, 1932 |